July 10, 1928.
R. H. ARROWOOD
1,677,115
CUTTER FOR ICE CREAM AND SIMILAR PRODUCTS
Filed Feb. 23, 1926
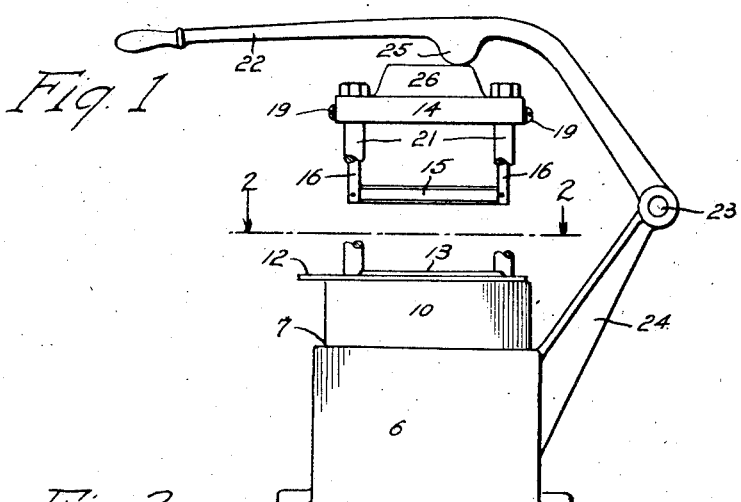
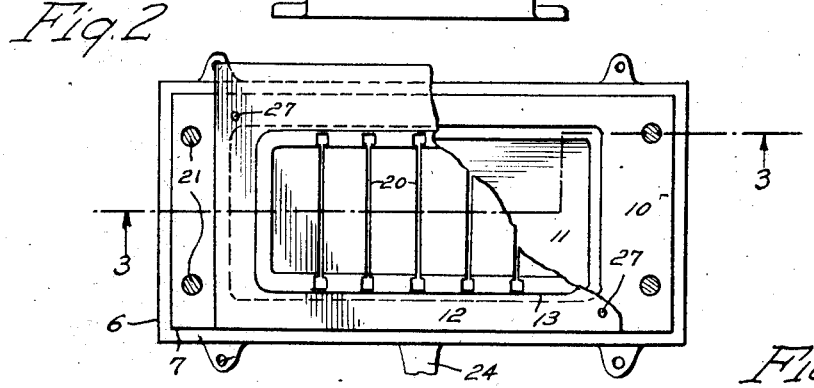
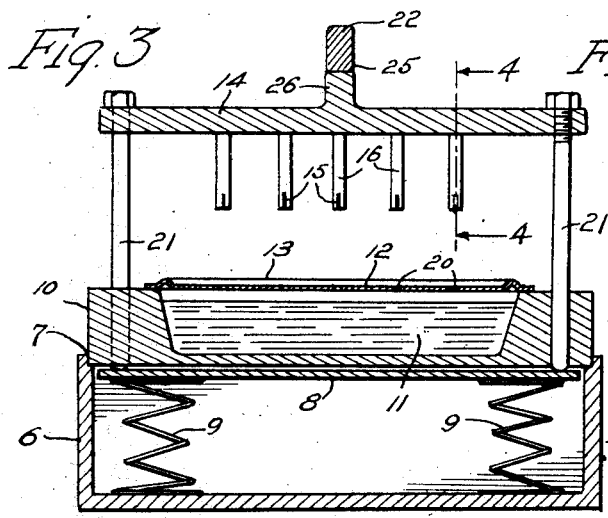
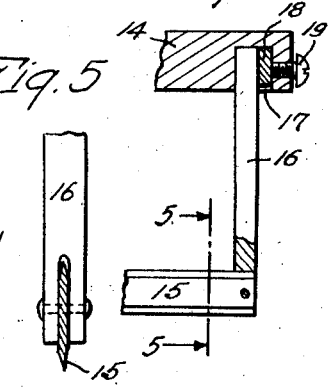
Inventor:
Reuben H. Arrowood,
by N.W. Crandall
Atty.

Patented July 10, 1928.

1,677,115

UNITED STATES PATENT OFFICE.

REUBEN H. ARROWOOD, OF LOS ANGELES, CALIFORNIA, ASSIGNOR OF ONE-HALF TO MILLARD M. MIER, OF LOS ANGELES, CALIFORNIA.

CUTTER FOR ICE CREAM AND SIMILAR PRODUCTS.

Application filed February 23, 1926. Serial No. 90,177.

In this specification, and the accompanying drawing, I shall describe and show a preferred form of my invention, and specifically mention certain of its more important objects. I do not limit myself to the forms disclosed, since various changes and adaptations may be made therein without departing from the essence of my invention as hereinafter claimed; and objects and advantages, other than those specifically mentioned, are included within its scope.

My invention relates to means for cutting ice cream and products of similar consistency. Its principal objects are; first, to provide improved means for simultaneously cutting such products in plural planes perpendicular to the base; second, to supply simple and convenient facilities for variably positioning the cutting elements for functioning as above; third, to furnish an improved method for preventing the material being cut from adhering to the cutting elements; and, fourth, to accomplish the above by means of a relatively inexpensive construction.

My objects are attained in the manner illustrated in the accompanying drawing, in which—

Figure 1 is a side elevation of my complete invention with certain parts shown broken for more clearly illustrating the construction.

Figure 2 is a plan view of the lower portion of the device, taken on the line 2—2 of Fig. 1;

Figure 3 is a cross section of the invention in elevation, the view being taken on the line 3—3 of Fig. 2;

Figure 4 is a fragmentary cross sectional detail of construction taken on the line 4—4 of Fig. 3; and Figure 5 is a similar fragmentary sectional view taken on the line 5—5 of Fig. 4.

Similar reference numerals refer to similar parts throughout the several views.

My invention comprises an open-top box-like base 6 having a rabbeted upper edge 7 into which the cutting mechanism is placed, resting upon the rabbet. A plate 8 loosely fits within base 6 and is supported at its four corners by helical compression springs 9. The cutting mechanism compresses a secondary dished base 10 containing a reservoir of water 11 of suitable temperature. Resting upon the secondary base, over the water, is a perforate plate 12 having a raised rim 13 adjacent its periphery. A cutting head 14 carries transverse knives 15, or other suitable cutting elements, depending therefrom by means of rods 16. The upper ends of these rods are engaged in a channel 17 formed in the under surface of head 14 adjacent its periphery, and may be variably positioned therein by means of gibs 18 and set screws 19 as shown in Fig. 4.

The perforations 20 in plate 12 are in the form of transverse slots with enlarged ends, and permit the cutting elements 15 and rods 16 to pass through the plate with slight clearance. A number of similarly perforated plates are made use of when it is desired to vary the spacing and positioning of cutting elements 15, and the latter must always be set in head 14, by means of the adjusting gibs and set screws, so as to pass properly through the perforations of the particular plate being used.

Cutting head 14 is vertically reciprocatable above secondary base 10, being guided for that purpose by slide rods 21 at its corners. The slide rods pass through corresponding holes in the secondary base, and their lower ends rest upon plate 8 and are supported thereby. A lever 22, pivoted at 23 to arm 24 attached to base 6, enables the cutting head with its attached cutting elements to be forced downwardly for cutting ice cream or similar material. When fully depressed the cutting elements have passed through slotted perforations 20 and are immersed in water 11. Here they are both wetted and slightly heated by the water so that when they are moved upwardly on the return stroke the severed material will not adhere to them.

The force exerted by lever 22 upon cutting head 14 may be sufficiently centralized by means of cam boss 25 on the lever and a coacting rib 26 on the cutting head. Perforate plate 12 is positioned and held in place of means of dowel pins 27 in secondary base 10. The springs 9 are made sufficiently strong to force the cutting head upward when pressure on lever 22 is removed.

Having thus fully described the construction and operation of my invention in a manner that will be clear to those familiar with such devices, I claim:

1. A device of the character described comprising; a base containing a reservoir with water therein; a perforate plate positioned upon the base above the reservoir adapted to allow the cutting elements to pass therethrough with small clearance into the water; a depressible cutting head guided by the base and carrying cutting elements depending therefrom; and springs adapted to yieldingly resist depression of the cutting head; said cutting elements being adjustably positioned upon the cutting head.

2. A device of the character described comprising; a base containing a reservoir with water therein; an interchangeable perforate plate positioned upon the base above the reservoir that allows the cutting elements to pass therethrough with small clearance into the water; a depressible cutting head guided by the base and carrying cutting elements depending therefrom; and springs adapted to yieldingly resist depression of the cutting head; said cutting elements being adjustably positioned upon the cutting head; and said perforate plate having a peripheral ridge therearound for positioning the material to be cut.

REUBEN H. ARROWOOD.